Aug. 28, 1956  W. H. BRUNS ET AL  2,761,038
LOAD WEIGHING DEVICES
Original Filed June 8, 1950

WILLIAM HENRY BRUNS  } INVENTORS
HAROLD EDWARD GALANTY

BY *J. L. Sharon* ATTORNEY

United States Patent Office 2,761,038
Patented Aug. 28, 1956

2,761,038

LOAD WEIGHING DEVICES

William Henry Bruns, Lincolndale, N. Y., and Harold Edward Galanty, Livingston, N. J., assignors to Otis Elevator Company, New York, N. Y., a corporation of New Jersey Continuation of application, Serial No. 166,937, June 8, 1950. This application December 14, 1953, Serial No. 397,974

9 Claims. (Cl. 200—85)

The invention relates to devices for weighing the load in elevator cars. This application is a continuation of the application, now abandoned, of William Henry Bruns and Harold Edward Galanty, filed June 8, 1950, Serial No. 166,937, for Load Weighing Devices.

It is desirable in many elevator installations to weigh the load in the elevator car. These load measurements may be utilized for various purposes, among which are automatically non-stopping the car past floors for which landing calls are registered, automatically starting the car on a trip when loaded to a certain percent of capacity, speed regulation, and obtaining accurate stopping of the car at the landings. Load measurements are effected either electrically or mechanically, the present invention being directed to mechanical load weighing devices.

The object of the invention is to provide a load weighing device in which switching mechanism is directly actuated by the load in the car and which is of simple and compact construction and accurate and reliable in operation.

In carrying out the invention according to the preferred arrangement which will be described, the platform of the elevator cab is supported on rubber pads arranged between the platform and the lower cross structure of the car framework. A micro-motion switch is mounted beneath the platform to be moved bodily by the deflection of the platform as the load in the cab increases. An abutment is mounted on a lower cross member of or attached to the car framework to directly actuate the switch. This abutment is positioned to be engaged by the switch operating member and to operate the switch when the load on the platform reaches a certain amount. The abutment is adjustable to enable the switch to be operated at various loads, thus giving a wide range of loads that may be measured.

Figure 1:
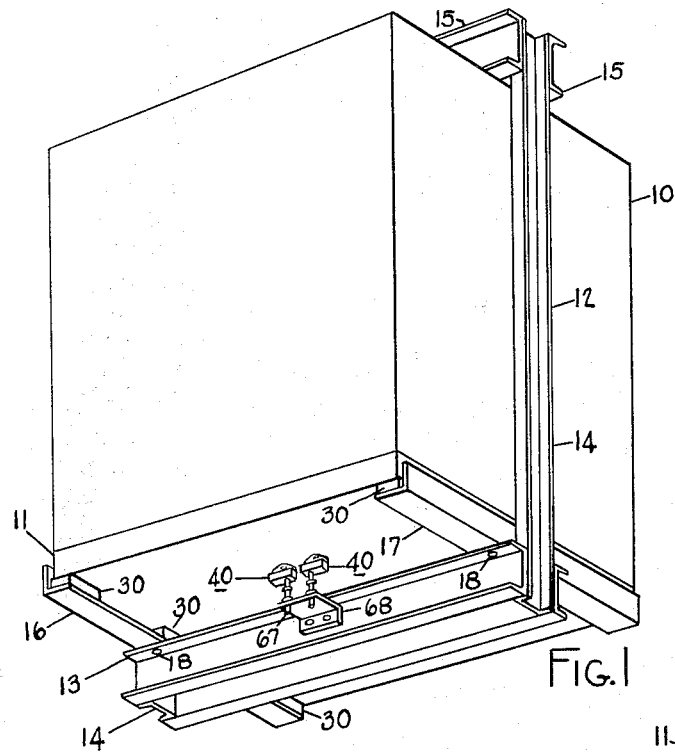
Figure 1 is a schematic view in perspective of an elevator car with load actuated switching mechanism arranged between the elevator cab and car framework in accordance with the invention.

Referring to the drawings, the elevator cab comprises an enclosure 10 mounted on a platform 11. The cab is arranged within a framework 12 comprising a safety plank 13, uprights 14 and crosshead 15. The uprights are in the form of channels and the safety plank and the crosshead each comprises a pair of channels secured to the sides of the uprights.

A pair of angle members 16 and 17 is secured as by bolts 18 to the top of the safety plank, one at each end of the plank. The angle members extend crosswise of the plank inside the uprights, to which they are also secured. These angle members are of a length equal to the depth of the car. For convenience, cross members connecting the ends of these angle members and other connecting members are not shown.

Figure 2:
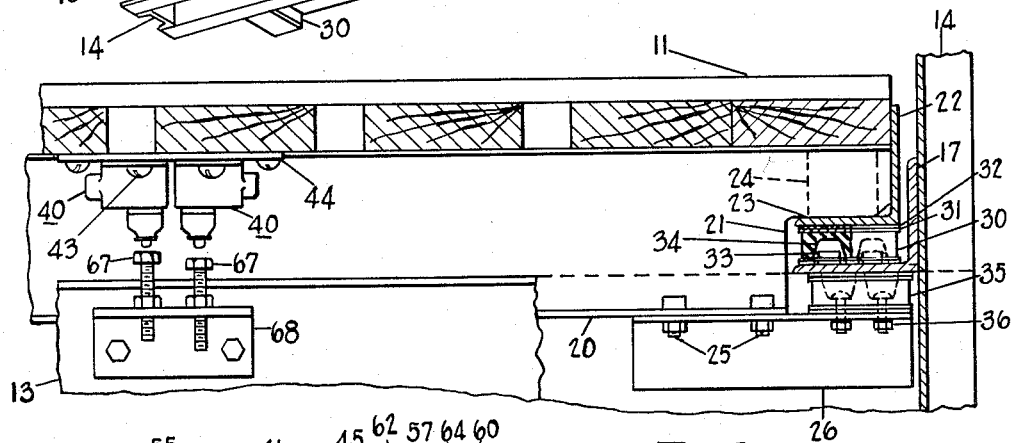
Figure 2 is a view in cross section, illustrating in detail the arrangement of the switching mechanism between the elevator cab platform and the car framework.

A channel member 20 secured to the bottom of the platform 11 extends downwardly between the channels of safety plank 13 and is cut away at its ends as indicated at 21 in Figure 2. The channel 20 is welded to the frame 22 of the platform 23 on each side of the platform and supporting wood blocks 24 are provided between the floor of the platform and the frame 22. On each side of the platform is an angle 26 secured to the bottom of channel 20 as by bolts 25 and extending under the cut-away portion 21.

The cab is supported on a plurality of rubber pads 30 between angle members 16 and 17 and frame 22. These pads are vulcanized to plates 31 in turn having rubber covering sheets 32 vulcanized thereto. These pads are located one at each end of each of angle members 16 and 17 and also one intermediate the ends of each of these angle members. Each pad is positioned with respect to the angle member by means of bolt heads 33 welded to the angle member and extending upwardly into apertures 34 formed in the pad. In this way the platform is located with respect to the car framework in such position that the cab is supported entirely on rubber pads without touching the framework. The rubber pads 30 have a natural frequency of vibration such as to render the effect of vibrations transmitted to the cab substantially negligible. Arranged between the angle member and the angle 26 at each side of the cab platform is another rubber pad 35 of the same construction as the pads 30. This pad is secured to the angle as by bolts 36. These pads obviate any jump of the cab in the car framework in case of a sudden stop in the up direction.

Figure 3:
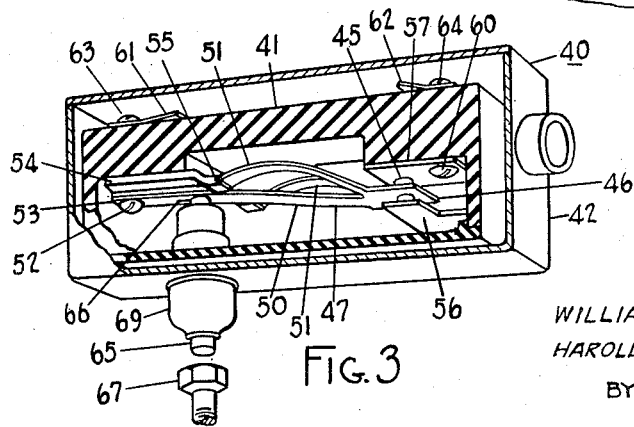
Figure 3 is a detail in perspective and somewhat schematic of a switch suitable for load actuation in accordance with the invention, parts being shown in section.

Secured to the bottom of the cab platform, preferably centrally with respect to the sides thereof and near center with respect to front and back, depending upon the operation point of the buffer mechanism, are one or more switches 40. Each switch is of the micro-motion type, that is, one in which a very small amount of movement is sufficient to effect operation. Also a switch is preferred which minimizes arcing. A suitable switch is illustrated in Figure 3. For convenience, this switch is illustrated as of the making contact type. The switch comprises a base 41 of insulating material mounted in a housing 42. The housing is secured as by screws 43 to a plate 44 in turn secured to the cab platform. The movable contact 45 of the switch is mounted on the end 46 of a contact spring 47. This spring has three blades, the intermediate blade 50 being longer than the outside blades 51. The contact spring is supported as a cantilever on the base by a screw 52 extending through the end 53 of blade 50. This screw also secures an anchor 54 for the outside blades to the base. This anchor is formed with grooves 55 into which the ends of the outside blades extend, placing these blades in compression. This biases the contact spring into position where its end 46 engages a stop in the form of a plate 56 secured to the base. A stationary contact in the form of a plate 57 is adapted to be engaged by movable contact 45 upon operation of the switch. This plate is secured to the base by a screw 60. Connections from screws 52 and 60 to terminal lugs 61 and 62 is effected by screws 63 and 64 and conductive bushings (not shown). The switch has an operating plunger 65 extending through the housing and engaging the intermediate blade 50 at a point 66 near screw 52. An abutment screw 67 is adjustably mounted on a bracket 68 secured to the safety plank in position to engage the plunger and operate the switch. A flexible seal 69 extends between plunger 65 and housing 42.

In operation, as passengers enter the car and increase the load on the platform, the switch moves downwardly with respect to screw 67, engaging the plunger 65 with the head of the screw and causing a gradually increasing force to be applied at point 66 to the cantilever member 50. When the upward vertical component of force overcomes the downward vertical component due to compression members 51, the movable contact 45 is snapped into engagement with stationary contact 57. Upon removal of the operating force due to discharge of passengers, the movable contact disengages the stationary contact with a snap action.

The switch may be of the breaking contact type instead of a making contact type, in which event plate 57 serves as a stop and plate 56 as the stationary contact. Also this switch may be a combination make—break switch in which event a movable contact also is provided below contact 45 and both plates 56 and 57 serve as stationary contacts. This depends upon the use to which the switch is put and the arrangement of the circuits in which the switch is employed.

Where it is desired to have switching operations for different loads on the car, it is preferred to provide a plurality of micro-motion switches, two having been indicated in Figures 1 and 2. This enables a setting of the abutment screw 67 for one switch different from that for the other, as indicated. While both switches are illustrated as having air gaps between their operating plungers and abutment screws, one or more of the screws could be set to be in contact with the corresponding plungers with no load in the car. This depends upon the construction and dimensions of the cab and the load percentage at which it is desired to have the switch operate.

While the invention has been described as applied to an elevator car having a sound isolated platform, it is also applicable to cars in which sound isolation is not provided. In such case in the construction illustrated, the pads 30 and 35 are omitted and the platform is mounted with frame 22 resting directly on the safety plank 13. There is sufficient deflection of the platform and beam 20 to operate the switches in such constructions but the sound isolated cabs are preferred as greater deflection of the platform is obtained under load, thus enabling the operating point of each switch to be more readily adjusted. However, as the invention is applicable where the cab has no sound isolation, it may be applied to existing installations having no sound isolation. Also the switches may be mounted in other positions so as to be subject to the movement of the elevator cab in the car framework. On high rise installations it may be considered desirable to mount the abutment screws on a separate channel not subject to the weight of the compensating ropes and travelling cable.

The particular switch construction illustrated is especially suitable as the lightning like snap action minimizes arcing at the contacts and thus gives long contact life. Also this switch has small movement differential, i. e., actual movement of cantilever member 50 at point 66 to initiate the snap action, enabling accurate adjustment of the operating point of the switch. A switch having a movement differential of .002" has been found satisfactory for installations of a wide range of duties. However, other types of switches may be used, such as the vacuum type switch which operates on small motion and in which the switch contacts are in an evacuated chamber. Also, while switches which minimizes arcing are preferred, other arrangements may be used, especially in certain circuit arrangements. The invention is especially applicable to passenger elevator installations but may be employed on freight elevators to advantage.

In utilizing the load measuring mechanism, for most purposes it is preferable to measure the load before the car starts. In such cases the load measurement obtained is registered as on holding switches and the load measuring mechanism is cut out of operation just before the car starts.

Thus it is seen that load measuring mechanism is provided which is of very simple and compact construction and which is positive, reliable and accurate in operation. Also this mechanism may be cheaply manufactured and installed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An elevator installation in which there is an elevator car having a framework and a cab carried by the framework, in which the cab has a platform which is supported on rubber pads positioned between the platform and the lower cross structure of the framework and in which means are provided for measuring load in the cab by movement of the cab platform with respect to the lower cross structure, characterized in that said load measuring means comprises an adjustable abutment and a micro-motion switch having an operating member which are mounted one to be moved by the cab platform and the other supported by the lower cross structure so that said member is engaged and moved by said abutment in a direction to operate said switch when the load in said cab reaches a certain amount, and that restraining means are provided for each of the rubber pads for preventing upon the cab being subjected to load lateral displacement of the contacting rubber surfaces of the pad with respect to the surfaces contacting the pad.

2. An elevator installation in which there is an elevator car having a framework and a cab carried by the framework, in which the cab has a platform which is supported on rubber pads positioned between the platform and the lower cross structure of the framework and in which means are provided for measuring load in the cab by movement of the cab platform with respect to the lower cross structure, characterized in that said load measuring means comprises an adjustable abutment and a micro-motion switch having an operating member which are mounted one to be moved by the cab platform and the other supported by the lower cross structure so that said member is engaged and moved by said abutment in a direction to operate said switch when the load in said cab reaches a certain amount, and that a pair of plates is provided for each of the rubber pads one on each side of the pad to which the pad is bonded.

3. An elevator installation in which there is an elevator car having a framework and a cab carried by the framework, in which the cab has a platform which is supported on rubber pads positioned between the platform and the lower cross structure of the framework and in which means are provided for measuring load in the cab by movement of the cab platform with respect to the lower cross structure, characterized in that said load measuring means comprises an abutment and a micro-motion switch having an operating member, and that mounting means are provided for mounting said switch and abutment between the cab platform and the lower cross structure so that said member is engaged and moved by said abutment when the load in said cab reaches a certain amount, said mounting means including a channel secured to the sides of the car framework beneath the car platform with respect to which the platform is movable and which is undistorted by load.

4. An elevator installation in which there is an elevator car having a framework and a cab carried by the framework, in which the cab has a platform which is supported on rubber pads positioned between the platform and the lower cross structure of the framework and in which means are provided for measuring load in the cab by movement of the cab platform with respect to the lower cross structure, characterized in that said load measuring means comprises an adjustable abutment and a micro-motion switch having an operating member, and that means including a beam secured to the sides of the car framework beneath the car platform which is not subject to the weight of the compensating ropes or traveling cable are provided for mounting said switch and abutment between th cab platform and the lower cross structure so that said member is engaged and moved by said abutment in a direction to operate said switch when the load in said cab reaches a certain amount.

5. An elevator installation in which there is an elevator car having a framework and a cab carried by the car framework, in which the cab has a platform which is supported on rubber pads positioned between the platform and the lower cross structure of the car framework and in which means are provided for measuring load in the cab by movement of the cab platform with respect to the lower cross structure, characterized in that said load measuring means comprises an abutment and a switch which are mounted one to be moved by said platform in unity ratio therewith and the other supported by the lower cross structure, said switch having a small motion operating member adapted to be engaged and moved by said abutment in a direction to operate said switch when the load in said cab reaches a certain amount.

6. In an elevator installation in which there is an elevator car having a framework and a cab carried by the car framework and in which the cab has a platform which is supported on rubber pads positioned between the platform and the safety plank of the car framework; a micromotion switch mounted beneath the platform to be moved thereby in unity ratio therewith, said switch having a downwardly extending operating plunger; and an abutment screw mounted on the car safety plank in position to engage said plunger to operate said switch.

7. An elevator installation in which there is an elevator car having a framework and a cab carried by the car framework, in which the cab has a platform which is supported on rubber pads positioned between the platform and the lower cross structure of the car framework and in which means are provided for measuring load in the cab by movement of the cab platform with respect to the lower cross structure, characterized in that said load measuring means comprises an abutment and a switch which are mounted one to be moved by the cab platform in unity ratio therewith and the other supported by the lower cross structure, said switch being a micro-motion switch having an operating plunger and having a movement differential of substantially .002 of an inch and said abutment being an adjustable screw positioned to engage said plunger and to move it in a direction to operate said switch upon an increase in load in said car.

8. An elevator installation in which there is an elevator car having a car framework and a cab carried by the framework, in which relative movement between the cab and the framework for the rated load range is approximately one sixteenth of an inch ($\frac{1}{16}''$) and in which means are provided for measuring load in the cab by movement of the cab platform with respect to the lower cross structure of the framework, characterized in that said load measuring means comprises an abutment and a small movement differential switch which are mounted one to be moved by the cab platform in unity ratio therewith and the other by the lower cross structure to cause operation of said switch when a load increment in the cab causes a relative movement between the cab and the framework equal to the movement differential of the switch, the relative position of said switch and said abutment being adjustable to effect operation of said switch at different loads.

9. In an elevator installation in which there is an elevator car having a car framework and a cab carried by the framework, and in which relative movement between the cab and the framework due to rated load in the cab is approximately one sixteenth of an inch ($\frac{1}{16}''$); a plurality of small movement differential switches secured to said cab to be moved in unity ratio therewith; operating members individual to each switch mounted on said framework; means for varying the relative position between each switch and its respective operating member to cause each switch to be operated at a cab load which is different from that at which the other switch is operated.

References Cited in the file of this patent

UNITED STATES PATENTS

| | | |
|---|---|---|
| 823,455 | Willcox | June 12, 1906 |
| 2,181,068 | Riche | Nov. 20, 1939 |
| 2,337,809 | Gaynor | Dec. 28, 1943 |
| 2,404,415 | Turner | July 23, 1946 |
| 2,462,041 | Hohler | Feb. 15, 1949 |
| 2,490,320 | Pashby | Dec. 6, 1949 |